United States Patent [19]

Solomon et al.

[11] 4,339,325

[45] Jul. 13, 1982

[54] ONE PASS PROCESS FOR FORMING ELECTRODE BACKING SHEET

[75] Inventors: Frank Solomon, Great Neck, N.Y.; Charles Grun, Matawan, N.J.

[73] Assignee: Diamond Shamrock Corporation, Dallas, Tex.

[21] Appl. No.: 202,583

[22] Filed: Oct. 31, 1980

[51] Int. Cl.³ .................... C25B 13/02; C25B 13/08
[52] U.S. Cl. ................................. 204/296; 264/49; 429/247; 429/42
[58] Field of Search .................. 204/296; 264/49; 429/247

[56] References Cited

U.S. PATENT DOCUMENTS

| | | | |
|---|---|---|---|
| 4,058,482 | 11/1977 | Baris | 252/425.3 |
| 4,150,076 | 4/1979 | Baris | 264/49 |
| 4,170,540 | 10/1979 | Lazarz | 204/296 |
| 4,196,070 | 4/1980 | Chao et al. | 204/266 |
| 4,289,600 | 9/1981 | Lazarz et al. | 204/296 |
| 4,292,146 | 9/1981 | Chang et al. | 204/98 |
| 4,297,196 | 10/1981 | Lazarz et al. | 204/296 |
| 4,302,303 | 11/1981 | Guillaume et al. | 204/124 |

OTHER PUBLICATIONS

Weast, Handbook of Chemistry and Physics, 52nd Ed., p. B-65, pub. by Chem. Rubber Co., Cleveland, Ohio, 1971.

*Primary Examiner*—F. Edmundson
*Attorney, Agent, or Firm*—John P. Hazzard

[57] ABSTRACT

This disclosure is directed to a one pass process for forming a porous, uniaxially oriented polytetrafluoroethylene sheet which is coherent and suitable for utilization as an electrode backing (wetproofing) sheet and the resulting backing sheet. Particulate PTFE is blended in an organic liquid medium to form a dispersion to which a pore-forming agent is added. After mixing, the organic liquid is removed and the dry mix is fibrillated, chopped and formed into a sheet by passing it once through heated rollers.

9 Claims, No Drawings

ONE PASS PROCESS FOR FORMING ELECTRODE BACKING SHEET

BACKGROUND OF THE INVENTION

In the field of electrochemistry, there is a well known electrochemical cell known as the chlor-alkali cell. In this cell an electric current is passed into a saturated brine (sodium chloride) solution to produce chlorine and caustic soda (sodium hydroxide). A large portion of the chlorine and caustic soda for the chemical and plastics industry is produced in chlor-alkali cells. Such cells are divided by a separator into anode and cathode compartments. The separator characteristically can be a substantially hydraulically impermeable membrane e.g., a hydraulically impermeable cation exchange membrane such as the commercially available NAFION manufactured by the E. I. duPont de Nemours and Co. Alternatively the separator can be a porous diaphragm, e.g, asbestos which can be in the form of vacuum deposited fibers or asbestos paper sheet as are well known in the art. The anode can be a valve metal, e.g., titanium, provided with a precious metal coating to yield what is known in the art as a dimensionally stable anode. The cathodes employed in such chlor-alkali cells are generally steel. At these cathodes both caustic soda and hydrogen are produced. Chlorine is produced at the anode. This is a very energy intensive process.

A fairly recent development in the chlor-alkali cell technology is the development of various forms of oxygen (air) cathodes. Such cathodes can result in significant savings in the cost of electrical energy employed in the chlor-alkali cells. It is estimated that there is a theoretical saving of about 25% of the total electrical energy employed to operate chlor-alkali cells provided that the formation of hydrogen gas at the cathode can be prevented. Stated alternatively, about 25% of the electrical energy in a chlor-alkali cell is utilized in the formation of hydrogen at the cathode. The prevention of hydrogen formation, e.g., by reducing oxygen at the cathode resulting in the formation of hydroxyl ions, can lead to the aforementioned savings in the cost of electricity. This is one of the major purposes for oxygen (air) cathodes. However, such cathodes are in contact with the electrolyte caustic soda and are subjected to the wetting action thereof.

One known form of oxygen (air) cathode involves an active layer containing carbon particles, which may or may not be catalyzed using precious metal catalysts, such as, silver, platinum, etc. The pores of the active layer may become wetted with the caustic soda thereby significantly reducing its ability to provide oxygen to the catalytic sites resulting in a loss of activity of the air cathode.

In an attempt to overcome these difficulties, hydrophobic materials, e.g., polytetrafluoroethylene (PTFE) have been employed in particulate or fibrillated (greatly attenuated and elongated) form to impart hydrophobicity to the active layer, per se, or to a protective or backing sheet which is laminated or otherwise attached to the active layer. Some oxygen (air) cathodes have been disclosed as containing PTFE in both the active layer and in a backing sheet laminated thereto.

FIELD OF THE INVENTION

The present invention is directed to a process for formation of a porous, coherent, sheet of PTFE which can subsequently be employed as a backing sheet when laminated on an active layer thereby forming an oxygen (air) cathode when secured to a current distributor.

PRIOR ART

U.S. Pat. No. 4,058,482 to Baris et al discloses an active layer sheet material, principally comprised of a polymer such as polytetrafluoroethylene and a pore forming material wherein the sheet is formed of co-agglomerates of the polymer and the pore former. This patent teaches mixing polymer particles with positively charged particles of a pore former, such as, zinc oxide, to form co-agglomerates thereof followed by mixing same with a catalyst suspension so as to form co-agglomerates of catalyst and polymer-pore former agglomerates and coating this agglomerate mixture onto a support sheet of carbon paper followed by pressing, drying and sintering. Subsequent to the sintering the pore former can be leached out of the electrodes. This patent does not form a separate PTFE-pore former layer, no rolling is involved and the catalyst-PTFE/pore former is coated onto a carbon paper which provides structural support.

U.S. Pat. No. 4,150,076 (a division of U.S. Pat. No. 4,058,482) is directed to the process for forming the sheet of U.S. Pat. No. 4,058,482, said process involving formation of polymer-pore former co-agglomerates, distributing same as a layer on a suitable electrode support plate, for example a carbon paper, to form a fuel cell electrode by a process which includes pressing, drying, sintering, and leaching.

The present invention avoids sintering which can lead to encapsulation of the pore former making it difficult or impossible to remove. This invention avoids use of significant pressures which would detract from the porosity of the PTFE layer in the overall cathode assembly when the laminate is subsequently formed. Additionally this invention results in a PTFE-pore former sheet whereas said Baris et al patents do not.

U.S. Pat. No. 4,170,540 to Lazarz et al discloses microporous membrane material suitable for electrolytic cell utilization formed from blending particulate polytetrafluoroethylene, a dry pore forming particulate material and an organic lubricant and a surfactant. These four materials are milled and formed into a sheet which is rolled to the desired thickness, sintered, and subjected to leaching of the pore forming material.

The present invention uses a slurry for processing and blends the PTFE and pore former in a wet condition and avoids the use of lubricants and similarly avoids the necessity to remove same. Additionally, according to the present invention when forming the sheet by passing the fibrillated mixture of PTFE-particulate pore forming agent through the rollers, special care is taken to avoid conditions which would cause the PTFE to sinter. Moreover, this invention enables the production of a fully formed sheet with only a single pass between rollers. The present invention is clearly distinguishable from U.S. Pat. No. 4,170,540. The surfactant incorporated in U.S. Pat. No. 4,170,540 would cause wetting of the porous PTFE sheet by the electrolyte and enhance subsequent flooding (filling of the pores of the PTFE wetproofing layer with electrolyte). This is to be avoided since it prevents the access of oxygen to the catalytic sites.

British Pat. No. 1,284,054 to Boden et al is directed to forming an air-breathing electrode containing an electrolyte within an air-depolarized cell. This air-breathing electrode is made by hot pressing a fluoropolymer sheet containing a pore-forming agent on to a catalyst composition (containing silver) and a metallic grid member. According to page 3 of said British patent, the PTFE-pore-forming agent-paraffin wax containing sheet is subjected to a solvent wash to remove the paraffin wax (lubricant and binder) and then sintered in a sintering furnace at the appropriate temperatures for sintering the fluorocarbon polymer. After the PTFE-containing sheet is sintered and while it still contains the pore-forming particles, it is then ready for application to the catalyst composition of the air electrode for the hot pressing operation. Hot pressing involves the use of pressures ranging from about 5,000 to about 30,000 psi in conjunction with temperatures ranging from 200° F. to 400° F.

The process of the present invention is readily distinguishable from British Pat. No. 1,284,054 in that the present invention avoids the use of a lubricant, avoids the trouble and expense of removing a lubricant and does not employ sintering and high pressures thereby imparting greater porosity to the PTFE in fibrillated form in the finished electrode. Also the present invention avoids repeated rolling, stripping—folding over—rolling again procedures (at least four passes through the rolls) required in both examples of the British Pat. No. 1,284,054. Such rerolling has the bad effect of reducing permeability (porosity) of the backing layer and makes production of a continuous strip impossible. As mentioned hereinabove, the present invention surprisingly allows the formation of a porous self-sustaining, coherent sheet of PTFE using only a single pass through rollers in a continuous fashion.

DESCRIPTION OF THE INVENTION

A variety of forms of Teflon can be used to make the wetproofing layers of this invention. In accordance with one embodiment, the Teflon ® particles can be of the duPont Teflon 6 series employed in the form of an alcohol, e.g, isopropanol, dispersion, made from duPont Teflon 6A viz., dry PTFE agglomerates of 500 to 550 micron particle size. These dry agglomerates (coagulates) containing PTFE have a particle size of about 500 to 550 microns and were originally made by coagulating smaller PTFE dispersed particles having particle sizes ranging from 0.05 to 0.5 microns and average particle size of about 0.22 microns). These agglomerates are redispersed in an organic liquid medium, usually a lower alkyl alcohol, such as isopropanol, and blended for several minutes to redisperse same in a high speed Waring blender and break up the larger particles into smaller particulate Teflon for use herein. Another form of Teflon which can be used is "Teflon 30" which is commercially available as an aqueous dispersion. Since the water base would prematurely dissolve the soluble pore former (when one is used); it is converted to an alcohol dispersion for use. This conversion is accomplished by coagulating the aqueous dispersion with trivalent metallic salts, e.g, lanthanum nitrate, or alcohols, e.g. isopropanol, in known manner; filtering off the coagulate PTFE; removing the wetting agent (used to disperse PTFE in water) and redispersing it in an alcohol, e.g, a lower alkyl alcohol, such as, isopropanol (as described above regarding the 6 series).

Both soluble, preferably water-soluble, e.g, sodium carbonate, and volatile, e.g., ammonium benzoate, ammonium carbonate, ammonium bicarbonate, fugitive pore-forming agents can be used herein.

Pulverized pore-forming particles, e.g., sodium carbonate particles in isopropanol, having particle sizes ranging from 1 to about 40 microns, and more usually from about 5 to 20 microns and preferably having an average (Fisher Sub-Sieve Sizer) particle size of 3 to 4 microns, are added to the alcohol dispersion of the blended PTFE particles (prepared as described above) in a weight ratio ranging from about 30 to about 70 weight parts of PTFE to about 70 to about 30 weight parts of sodium carbonate and high speed blended. Then the alcohol is removed and the PTFE-$Na_2CO_3$ mix particles are dried.

Subsequent to drying, the particulate PTFE-sodium carbonate mixture is subjected to Sigma mixing under conditions which mildly "fiberize" (fibrillate) the PTFE. The sigma mixing is conducted in a Brabender Prep Center (Model D101) with attached Sigma Mixer (Model 02-09-000) having a volume cavity of 650 ml. with a charge of approximately 140 g. of mix. This fibrillation is performed for approximately 10 to 20, e.g., 15 minutes at 100 r.p.m. at ambient room temperatures, 15° to 25° C., e.g., 20° C.

After fibrillating and before forming the backing sheet by passing the mix between rolls; the fibrillated PTFE-pore former mix is chopped for 1-20 seconds, e.g. 5 to 10 seconds, before rolling.

The mildly "fiberized", chopped particulate mixture of PTFE—sodium carbonate is then dry rolled into sheet form using a single pass through one or more sets of metal, e.g. chrome-plated steel rolls. Temperatures of about 65° C. to about 115° C. (but below the volatilization temperature of the pore former when a volatile pore former is used) and roll gaps ranging from about 5 to about 15 mils are customarily employed (to define the wet-proofing layer thickness). The conditions employed in the dry rolling are such as to avoid sintering of the PTFE particles.

EXAMPLE 1

(Single Pass with Soluble Pore-Former)

Two hundred cubic centimeters of isopropyl alcohol were poured into an "Osterizer" blender. Then 49 grams of duPont 6A polytetrafluoroethylene were placed in the blender and the PTFE—alcohol dispersion was blended at the "blend" position for approximately one minute. The resulting slurry had a thick pasty consistency. Then another 100 cc of isopropyl alcohol were added in the blender and the mixture was blended (again at the "blend" position) for an additional two minutes.

Then 91 grams of particulate sodium carbonate in isopropanol (Ball milled and having an average particle size of approximately 3.5 microns, as determined by a Fisher Sub Sieve Sizer) were added to the blender. This PTFE—sodium carbonate mixture was then blended at the "blend" position in the "Osterizer" blender for three minutes followed by a higher speed blending at the "liquefying" position for an additional one minute. The resulting PTFE—sodium carbonate slurry was then poured from the blender on to a Buchner funnel and filtered and then placed in an oven at 80° C. where it was dried for three hours resulting in 136.2 grams yield of PTFE—sodium carbonate mixture. This mixture contained approximately 35 weight parts of PTFE and 65 weight parts of sodium carbonate.

This mixture was mildly fibrillated in a Brabender Prep Center with attached Sigma mixer as described above.

After fibrillating, which compresses and greatly attenuates the PTFE, the fibrillated material is chopped to a fine dry powder using a coffee blender, i.e., Type Varco, Inc. Model 228.1.00 made in France. Chopping to the desired extent takes from about 5 to 10 seconds because the mix is friable. The extent of chopping can be varied as long as the material is finely chopped.

The chopped PTFE-$Na_2CO_3$ mix is fed to six inch diameter chrome-plated steel rolls heated to about 80° C. Typically these rolls are set at a gap of 0.008 inch (8 mils) for this operation. The sheets are formed directly in one pass and are ready for use as backing layers in forming electrodes, e.g., oxygen cathodes, with no further processing beyond cutting, trimming to size and the like.

The thus formed layers (after removal of the pore-forming agent) are characterized as porous, self-sustaining, coherent, unsintered, uniaxially oriented backing (wetproofing) layers of fibrillated polytetrafluoroethylene having pore openings of about 0.1 to 40 microns (depending on the size of the pore former used) and exhibit air permeability particularly well-suited for oxygen (air) cathodes.

EXAMPLE 2

The procedure of Example 1 was repeated with the exception that after the PTFE/$Na_2CO_3$ sheet was passed through the rollers once, it was folded in half and rerolled in the same direction as the original sheet. A disc of this material was pressed at 8.5 tons per square inch and 115° C. and then washed with water to remove the soluble pore former. Permeability tests conducted on this sample resulted in a permeability of 0.15 ml. of air/minute/$cm^2$ at a pressure of one cm of water as compared to a test sample prepared according to EXAMPLE 1 and pressed and washed as above which gave a permeability of 0.21 ml of air/minute/$cm^2$ per cm of water. The permeability test was done according to the method of A.S.T.M. designation E 128-61 (Maximum Pore Diameter and Permeability of Rigid Porous Filters for Laboratory Use) in which the test equipment is revised to accept air electrodes for test rather than the rigid filters for which the test was originally designed. The revision is a plastic fixture for holding the air electrode in place of the rubber stopper shown in FIGS. 1 and 2 of said A.S.T.M. standard.

Apparently folding and rerolling are counter productive to air permeability, an important and desired property in a backing layer for an oxygen cathode. Moreover folding and rerolling may form lamina which give rise to delamination of the backing layer in use, e.g., in a chlor-alkali cell.

EXAMPLE 3

(Single Pass with Volatile Pore Former)

A porous Teflon sheet was fabricated using a mixture of 40 wt.% ammonium benzoate (a volatile pore former) and 60 wt.% PTFE prepared as in EXAMPLE 1. The sheets were fabricated by passing the above mix (fibrillated and chopped) through the 2 roll mill once. The rolled sheet was then pressed at 8.5 tons per square inch and 65° C. The volatile pore former was then removed by heating the sheet in an oven at 150° C. Substantially all of the volatile pore former was thus sublimed leaving a pure and porous PTFE sheet. Permeability of these sheets averaged 0.2.

What is claimed is:

1. A porous, coherent, unsintered, uniaxially oriented backing (wetproofing) layer of fibrillated polytetrafluoroethylene having pore openings ranging from about 0.1 to 40 microns and having an air permeability of about 0.2 ml. per minute per centimeter squared per centimeter of water pressure, said layer being from about 5 to 15 mils thick.

2. A process for preparing a porous, uniaxially oriented backing (wetproofing) layer comprising blending particulate polytetrafluoroethylene in an organic liquid medium to form a dispersion; adding a particulate pore-forming agent having an average particle size ranging from about 0.1 to 40 microns; mixing said polytetrafluoroethylene and pore forming agent; removing said organic liquid medium; fibrillating said dried mix; chopping said fibrillated mix to powder form and forming a sheet (layer) therefrom by passing it once through heated rollers.

3. A process as in claim 2 wherein said mix contains from about 30 to 70 weight parts of pore-forming agent and from about 70 to 30 weight parts polytetrafluoroethylene.

4. A process as in claim 2 wherein said pore-forming agent is a soluble pore forming agent.

5. A process as in claim 4 wherein said soluble pore-forming agent is sodium carbonate.

6. A process as in claim 2 wherein said pore-forming is a volatile pore-forming agent.

7. A process as in claim 6 wherein said volatile agent pore-forming agent is ammonium benzoate.

8. A process as in claim 2 wherein said rollers are heated at temperatures ranging from about 65° C. to about 115° C.

9. A process for preparing a porous, uniaxially oriented backing (wetproofing) layer comprising blending particulate fibrillatable polytetrafluoroethylene in a liquid medium to form a dispersion; adding a particulate ammonium benzoate having an average particle size ranging from about 0.1 to 40 microns; mixing said polytetrafluoroethylene and ammonium benzoate; removing said liquid medium; fibrillating said dried mix of fibrillatable polytetrafluoroethylene and ammonium benzoate; chopping said fibrillated mix to powder form and forming a sheet therefrom by passing it once through heated rollers and thereafter heating said sheet above 160° C. to sublime the ammonium benzoate to produce the porous polytetrafluoroethylene layer.

* * * * *